3,093,099
REFRACTORY ROOF CONSTRUCTION
Chester E. Grigsby, Penn Wynne, Philadelphia, Pa., assignor to General Refractories Company, Philadelphia, Pa., a corporation of Pennsylvania
Filed Feb. 13, 1961, Ser. No. 89,000
3 Claims. (Cl. 110—99)

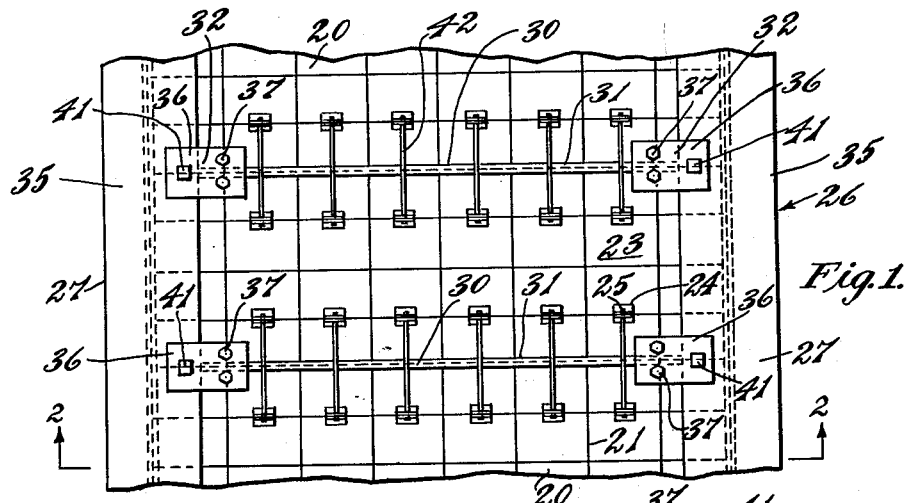
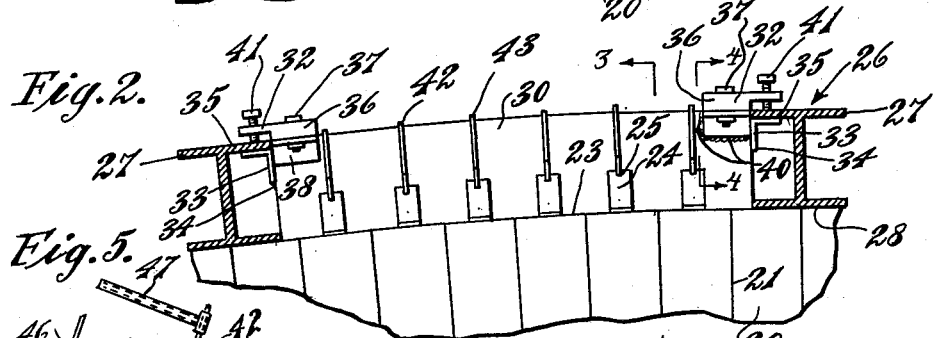
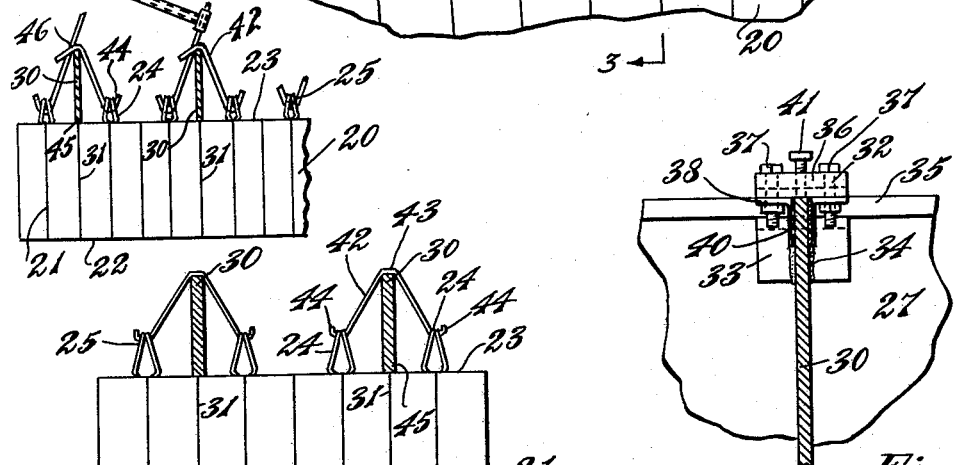
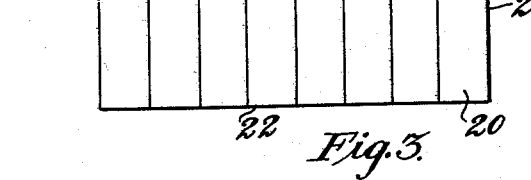
INVENTOR
CHESTER E. GRIGSBY
BY
ATTORNEYS United States Patent Office 3,093,099
Patented June 11, 1963

The present invention relates to basic refractory roofs for open hearth steel furnaces, electric arc steel furnaces and other furnaces, especially metallurgical furnaces.

A purpose of the invention is to hold every brick in the roof up and also hold it down, either by direct suspension or by friction with fixed adjacent bricks. By having every brick held rigidly in place in a basic refractory roof, the entire structure is protected against failure by sagging and buckling, especially when the roof begins to wear thin. Service results on sprung basic roofs in open hearth steel furnaces of several different steel companies have proved that even though the roof is held down by fixed longitudinal I beams on 3′ centers, skew to skew, the roof sags and fails early unless it is also held up. The length of service without all the bricks being held up as well as held down, has been about half that in roofs in which bricks are held up and held down by friction with fixed transverse steel plates or by friction with fixed adjacent bricks.

A further purpose is to reduce the cost of the replacement of the supporting steel structure after each campaign in a basic refractory roof for steel furnaces by eliminating the need for extension of consumable steel plates integral with the supporting structure into the space between two bricks. In a basic refractory roof on an open hearth steel furnace, the usual transverse steel plates between bricks and integral with the supporting structure are replaced in the present invention with transverse steel corset plates which are in contact with the top of the roof. These corset plates are reusable indefinitely, since they are not consumed along with the bricks (as are steel plates between bricks in present sprung, tab-suspended and sprung-suspended combination basic roofs in open hearth steel furnaces in this country).

A further purpose is to hold the roof down between the hold down beams by engaging the cold ends of the refractory bricks forming a roof by the lower edges of transverse corset plates whose greatest cross sectional dimension is generally vertical, having the lower edges of the corset plates in contact with the cold ends of the bricks, the corset plates being placed generally parallel to a joint between lateral faces of the bricks, so that the tabs on the cold ends of the bricks can be easily connected to wire saddle hangers which rest on the tops of the corset plates, thus suspending the bricks from the corset plates.

A further purpose is to support the bricks by one or two saddle hangers which rest on the tops of the corset plates and extend through tab-hanger connections from the bricks at either side of the corset plates.

A further purpose is to hold the roof down by attaching both ends of each corset plate at approximately 90°, adjustably on existing hold down beams or in new construction on suitable hold down beams which run parallel to the length of rectangular open hearth steel furnaces, and run radial on circular electric steel furnaces, and which themselves are rigidly held up and held down by adjustable radial pipes pinned to the rigid steel cross members between vertical steel buckstays in open hearth steel furnaces and which are bolted to the steel roof ring in electric arc steel furnaces, and which in both types of furnaces are directly or indirectly in firm contact with the cold ends of the bricks and which, together with the adjustable transverse corset plates whose lower edges are in contact with the cold ends of the bricks, eliminate completely any possible rise of the roof.

A further purpose is to make the corset plates relatively thin and relatively wide, the vertical cross sectional dimension of the corset plates in position being at least six and in most cases at least twelve times the lateral cross sectional dimension, so as to reduce the tendency of the corset plates themselves to buckle because of longitudinal thermal expansion of the lower edge of the plate in contact with the hot refractory bricks. It will thus be evident that an additional advantage of using relatively thin plates is that the maximum possible surface of the cold ends of the bricks is exposed for cooling, thus avoiding the destructive insulating effect of steel members having flanges in contact with the cold ends of the bricks.

A further purpose is to avoid excessive heating, oxidation, and deformation of corset plates which would occur if they extended down between the sides of the refractory bricks, as in present construction in most open hearth steel furnaces in this country.

A further purpose is to increase the service life of roofs in very hot furnaces by eliminating the spalling which occurs in the first ring of bricks on each side of each transverse plate in present construction when the plate melts out to a depth of several inches back from the hot face, thus increasing the spalling of adjacent bricks by exposing an extra face of each adjacent brick to heating and cooling with variations in furnace temperature.

Further purposes appear in the specification and in the claims.

In the drawings I have chosen to illustrate only the most widely used of the numerous embodiments in which my invention may appear, selecting the forms shown from the standpoints of convenience in illustration, satisfactory operation and clear demonstration of the principles involved.

FIGURE 1 is a fragmentary top plan view of an open hearth steel furnace roof in accordance with the invention.

FIGURE 2 is a fragmentary section of FIGURE 1 on the line 2—2.

FIGURE 3 is a fragmentary section of FIGURE 2 on the line 3—3. This one piece saddle is for construction without forms (false work).

FIGURE 4 is an enlarged fragmentary section of FIGURE 2 on the line 4—4.

FIGURE 5 is a view similar to FIGURE 3 but with two piece saddles for use with false work (forms).

In the various views, the bricks shown are "key" bricks suitably of 4½″ x 3″ transverse cross-section, the 4½″ dimension being placed at about 90° to the length of the furnace. This invention applies equally well to "key" bricks of 6″ x 3″ or any other transverse cross-section, as well as to "wedge" bricks suitably of 4½″ x 3″ transverse cross-section in which the 4½″ dimension is placed substantially parallel to the length of the furnace and also to "wedge" bricks of 6″ x 3″ or any other suitable transverse cross-section or to "wedge" bricks or "key" bricks of 3½″ x 2¼″ transverse cross-section or to bricks of 3″ x 3″ transverse cross-section, and to any and all "wedge" or "key" bricks of any desired cross-section for open hearth steel furnaces. The invention is also applicable to the "straight" bricks, for use in flat roof or corbeled roofs.

In electric arc steel furnaces the bricks used may be any desired combination of arch bricks, wedge bricks, key bricks, key-arch bricks, or key-wedge bricks or dome bricks each and every brick being of any desired transverse cross-section including but not limited to 6" x 3", 4½" x 3" or 3" x 3".

Describing in illustration but not in limitation and referring to the drawings:

In the prior art, in this country, in open hearth steel furnaces, transverse steel plates between basic bricks in sprung roofs have been eliminated in several plants, but roof life has usually been unsatisfactory due to early sagging and buckling of the roof. Thus, it has generally been necessary to return to the use of the present, almost universally used, troublesome, expensive consumable steel plates extending through the joints between bricks to the hot face.

In the prior art in this country, sprung, tab-suspended or sprung-tab suspended basic roofs on open hearth steel furnaces are usually built with ³⁄₁₆" thick transverse steel plates which extend down between the refractory bricks on 6", 9", 12", 15", 18", 21" or 24" centers and thus in effect become part of the refractory construction itself. Of course, such plates cannot be reused since the portion in the joints of the brickwork is consumed along with the bricks and, therefore, the expense of each roof is increased to the extent of several thousand dollars. In this invention, this money will be saved since the corset plates of this invention do not extend below the cold ends of the roof bricks, since they are not consumed or damaged during the campaign and since they can, therefore, be reused indefinitely. The extra cost of tab bricks for completely suspended construction will be largely offset by elimination of ribs which are now used in most sprung roofs without tab bricks, and the cost of tab-corset roofs with half tab-suspended, half sprung construction may be considerably less than that of sprung roofs with the usual number of rib bricks 3" longer than the valley bricks. Over a long period of time the original cost of numerous tab-corset roofs will be appreciably lower than that of an equal number of the same roofs as they are now built.

The installation of such prior art roofs necessitates the laborious and expensive fabrication of a new set of plates for every roof, and the assembly and installation of plates extending down between the refractory bricks is also quite tedious and time consuming.

Furthermore, spalling and other refractory failures due to the thermal expansion, oxidation and/or melting out of the steel plates (in very hot furnaces) where they extend down between the refractory bricks are serious causes of accelerated wear and distortion of the roof.

I believe that service life of basic refractory roofs can be greatly improved (in very hot furnaces) by employing reusable steel corset plates which directly or indirectly hold the refractory bricks up and also hold them down and which terminate at and in contact with the cold ends of the bricks. If a sufficient number of individual bricks are held up, and held down, the friction between the suspended bricks and adjoining bricks or bricks adjacent to the latter will hold up the adjoining bricks and those adjacent to them, and will also hold them down, and thus it will be impossible for any part of the roof to deform. In accordance with the present invention, corset plates are employed which do not extend into the joints between bricks and which will not be consumed when the roof requires replacement but which can be reused indefinitely. This amounts to a great saving in cost of roof which is the prime purpose of this invention in open hearth steel furnaces, and which is also very important in large electric steel furnace roofs which sag and buckle excessively and fail prematurely (as in prior art where no suspension or hold down beams have been tried to date in this country), and therefore are not economical without every brick being held up and held down directly or indirectly as in the present invention.

Furthermore, in accordance with the invention, the corset plates can be installed on top of the roof after the refractory roof has been completely installed on forms (false work) as in FIGURE 5. FIGURE 3 shows the one piece saddle construction used when the roof is installed without forms (false work). At present most roofs are built with forms, so FIGURE 5 would apply in most cases.

The invention is applicable to completely suspended roofs and combinations of suspended and sprung arches as desired. FIGURE 3 shows completely suspended construction, but partially suspended, partially sprung construction can be used by alternating four or more rows of suspended bricks with two or more rows of unsuspended bricks. The unsuspended bricks in each unsuspended course are held up by the natural forces of a sprung arch, aided by edge friction between them and adjoining suspended bricks (or sprung bricks which in turn are held up by edge friction with adjoining suspended bricks or by sprung bricks which are held up by other sprung bricks which in turn are held up by adjoining suspended bricks). The principles of the invention can be applied either to complete roofs or they can also be employed in certain sections only of a roof, as for example in the port roofs over the uptakes and bridgewall in an open hearth steel furnace or in the main roof only, with sprung port roofs of basic bricks or silica bricks or both.

Likewise, the invention is applicable to rectangular simple arch sprung roofs as in open hearth steel furnaces and also to circular domed roofs as in electric arc steel furnaces. It will be understood that the question of whether transverse corset plates and longitudinal holddown beams extend in parallel relation to each other in a rectangular roof (as for a typical open hearth steel furnace) or whether the hold-down beams are radial and the corset plates are in arc-shaped sections of concentric circles between the radial beams to which they are attached at each end (as in a spider web corset for a typical electric arc steel furnace) is a matter merely of design of a roof for a particular type of furnace and the invention may be employed in constructions of all of these various types.

Considering now the drawings in detail, for a typical open hearth steel furnace I illustrate a plurality of basic refractory bricks 20 arranged vertically, or geneally vertically, at an angle which depends on whether the arch is flat or curved. The bricks are burned or unburned, suitably of magnesia, magnesia-chrome, chrome-magnesia, or any other suitable basic composition, as well known in the art, and they may be of any desired length and cross section and will suitably be provided with external and usually also with internal oxidizable steel plates, also as well known in the art.

Each of the basic refractory bricks has lateral faces 21 which adjoin other refractory bricks except at the outer edge, has a lower hot end 22, and an upper cold end 23.

At or suitably above the cold end there is a hanger projection 24, suitably a steel hanger tab, interconnected with the refractory brick as by comolding as well known and having a hanger-receiving opening 25.

The present invention is not concerned with the question as to whether all of the bricks are provided with and supported by steel hanger tab projections or whether some of the bricks are supported directly or indirectly by lateral frictional engagement with others which are provided with such hanger projections, as well known in the art.

Above the cold end 23 there is a steel supporting structure 26 which in the preferred embodiment in open hearth steel furnaces as shown comprises longitudinal steel hold down beams 27 (suitably I-beams or H-beams held up and held down by radial pipes pinned to cross binding of the furnace) in spaced relation, which usually engage directly against the cold ends of bricks at 28, although in some embodiments channels or other extensions secured to the bottoms of the beams engage the cold ends of the bricks and thus raise the bottoms of the beams 1"–3" or more above the refractory to improve service by reducing the insulating effect of the beam on the roof bricks and by making it easier to remove dust which also is a bad insulator. The refractory bricks immediately beneath the beams may be supported by frictional engagement with adjoining bricks if desired.

Distributed at intervals above the cold ends of the bricks and running generally parallel to the lines of the joints between certain of the lateral faces of the bricks are steel corset plates 30, which have a much greater cross section transverse to the cold surfaces of the bricks (substantially vertical) than their cross section horizontally (thickness), so as to provide great depth of section to hold the bricks up and hold the bricks down, eliminating deformation of the roof in both vertical directions. The width of the corset plates 30 is thus desirably at least six times the thickness and most desirably at least twelve times the thickness. It is preferable as shown to have the heights of the corset plates in position the same as the heights of the beams 27.

In a particular example, corset plates may have a thickness of half an inch and a width of six inches or a thickness of one inch and a width of six inches.

The corset plates are mounted at a position which ideally (but rarely in actual construction) will place them partly on each side of the line of joints 31 between certain lateral faces of the bricks, by a fastening mechanism or bracket 32 at each end which engages the cooperating upper flanges of the beams. In one form, as shown, the fastening mechanism comprises an angle 33 welded at 34 to the end of the corset plate and engaging under the upper flange 35 of the I beam, and a bracket 36 extending above the upper flange 35 of the I beam and secured by bolts 37 to angles 38 which are welded at 40 to the sides of the corset plates near the ends.

Each of the brackets 36 has a clamping set screw 41 threaded therethrough, which can be tightened to engage firmly against the top of the upper flange 35 of the beam 27 at whatever angle is required by the line of the transverse joints between bricks.

The tops of the corset plates are engaged at intervals along the lengths of the corset plates by one or two piece steel saddle hangers 42 (suitably of ¼" wire) which in roofs built without forms have a horizontal central portion resting at 43 on the corset plates and have hook ends 44 which extend through and engage in the openings 25 of tabs 24 of two adjoining bricks at each hook end. In roofs built with forms, a two piece saddle hanger is used (FIGURE 5).

In a very simple manner of erecting the construction, existing hold-down beams and radial pipes will be raised to provide room for construction, steel or wood forms (false work) will be erected to support the hot ends of the bricks and the bricks 20 will be assembled in the correct configuration for the arch. Then the beams 27 are set in place immediately against the cold ends of the brick in spaced relation (suitably parallel) in open hearth steel furnaces, as shown in FIGURES 1 and 2. The radial pipes above the hold down beams are then pinned to the cross binding of the furnace. (In electric arc steel furnaces the chief hold down beams are radial steel plates on edge.) Next the corset plates 30 are installed (generally parallel to the transverse joints in the roof) at positions which correspond to the selected spaced lines of joints 31 running transversely and the clamping screws 41 are tightened to hold the corset plates in position, with their lower edges 45 resting firmly against the cold ends of the bricks and generally parallel to the lines of joints 31. Unlike prior art practice, the corset plates do not extend down between the bricks.

Next the tabs 24 are bent up into the positions shown and the two piece saddle hangers (FIGURE 5) suitably formed by bending ¼" wire, are inserted through the openings 25 of the tabs and bent at 46 over the top of the corset plates with a suitable hand tool 47, one from one side, one from the other, to tightly engage the tabs.

The false work can then be removed and the furnace placed in operation.

If desired, the procedure for assembly can be reversed, by assembling the beams and the corset plates, and then installing and hanging the bricks progressively without false work, as in FIGURE 3, but construction is slower and forms are used at most plants. The extra cost of the tab bricks is not greatly different than the rib bricks used in most sprung roofs (ribs are not necessary with the present invention).

It will be evident that when reference is made in the claims to the beams it is intended also to include the extensions which are attached to the beams.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a refractory roof construction, a plurality of basic refractory bricks arranged side by side, having hot ends and cold ends, and having hanger connections near the cold ends, in combination with steel supporting structure above said bricks including a plurality of longitudinally extending steel beams in laterally spaced relation extending adjacent the bricks above the cold ends and a plurality of transversely extending steel corset plates extending between said longitudinally extending beams and connected thereto and extending generally vertically, said beams and corset plates being in contact with and terminating at the cold end of the bricks, and hanger means extending from said corset plates through the hanger connections of said bricks.

2. A refractory roof of claim 1, in which the hanger connections comprise hanger tabs extending above the cold ends of the bricks and the hangers are of saddle form resting on the corset plates and extending through the hanger tabs at either side of each corset plate.

3. A refractory roof of claim 1, in which the corset plates are adjustably interconnected with the beams.

References Cited in the file of this patent

UNITED STATES PATENTS

| 2,011,701 | Anderson | Aug. 20, 1935 |
| 2,659,326 | Honig | Nov. 17, 1953 |
| 3,005,423 | Longenecker | Oct. 24, 1961 |

FOREIGN PATENTS

| 168,088 | Australia | Sept. 20, 1956 |
| 623,230 | Germany | Dec. 16, 1935 |
| 771,598 | Great Britain | Apr. 3, 1957 |